(12) United States Patent
Hsieh et al.

(10) Patent No.: US 10,598,934 B2
(45) Date of Patent: Mar. 24, 2020

(54) HEAD-MOUNTED DISPLAY APPARATUS

(71) Applicant: Coretronic Corporation, Hsin-Chu (TW)

(72) Inventors: Chi-Tang Hsieh, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 30 days.

(21) Appl. No.: 15/364,279

(22) Filed: Nov. 30, 2016

(65) Prior Publication Data
US 2017/0212350 A1    Jul. 27, 2017

(30) Foreign Application Priority Data
Jan. 21, 2016    (TW) .............................. 105200940 U

(51) Int. Cl.
*G02B 27/01*    (2006.01)
*G02B 27/00*    (2006.01)

(52) U.S. Cl.
CPC ..... *G02B 27/0172* (2013.01); *G02B 27/0025* (2013.01); *G02B 27/0176* (2013.01); *G02B 27/01* (2013.01); *G02B 27/0101* (2013.01); *G02B 2027/011* (2013.01); *G02B 2027/013* (2013.01); *G02B 2027/0141* (2013.01)

(58) Field of Classification Search
CPC .............. G02B 27/0172; G02B 27/01; G02B 27/0101; G02B 27/0149; G02B 27/017; G02B 27/0176; G02B 27/0179; G06T 19/006; H04N 13/044; H04N 5/7491; G02C 11/00

USPC ..... 359/13–14, 158, 618, 629–633; 345/7–9, 345/632–633; 348/113–120; 349/11; 351/158

See application file for complete search history.

(56) References Cited

U.S. PATENT DOCUMENTS

| | | | | |
|---|---|---|---|---|
| 4,761,056 A | * | 8/1988 | Evans ..................... | A42B 3/042 348/115 |
| 5,266,930 A | * | 11/1993 | Ichikawa ................ | A42B 3/042 345/8 |
| 5,341,242 A | * | 8/1994 | Gilboa ............... | G02B 27/0172 359/365 |
| 5,822,127 A | * | 10/1998 | Chen .................. | G02B 27/0172 359/631 |

(Continued)

FOREIGN PATENT DOCUMENTS

| | | |
|---|---|---|
| CN | 104914576 | 9/2015 |
| TW | 563818 | 11/2003 |
| TW | 580588 | 3/2004 |

OTHER PUBLICATIONS

Zemax, LLC, " Zemax," The User's Manual of Optical Design Program, Jul. 8, 2011, pp. 1-805.

*Primary Examiner* — Kristina M Deherrera
(74) *Attorney, Agent, or Firm* — JCIPRNET

(57) ABSTRACT

A head-mounted display apparatus including a main body, a mask, and a projection apparatus is provided. The mask is pivotally connected to the main body. The mask includes a reflection area. The reflection area has a first normal line. The projection apparatus is disposed inside the main body and adapted to project an image beam to a target. The projection apparatus includes a mirror. The mirror has a second normal line. An acute angle exists between normal projections of the first normal line and the second normal line on a reference plane.

8 Claims, 5 Drawing Sheets

(56) References Cited

U.S. PATENT DOCUMENTS

| | | |
|---|---|---|
| 6,747,802 B2 | 6/2004 | Bignolles et al. |
| 9,239,453 B2* | 1/2016 | Cheng .................... G03B 21/00 |
| 2013/0021224 A1* | 1/2013 | Fujikawa ........... G02B 27/0101 |
| | | 345/7 |
| 2017/0357093 A1* | 12/2017 | Dobschal ........... G02B 27/0172 |
| 2018/0045958 A1* | 2/2018 | Kuzuhara .............. B60K 35/00 |

* cited by examiner

HEAD-MOUNTED DISPLAY APPARATUS

CROSS-REFERENCE TO RELATED APPLICATION

This application claims the priority benefit of Taiwan application serial no. 105200940, filed on Jan. 21, 2016. The entirety of the above-mentioned patent application is hereby incorporated by reference herein and made a part of this specification.

BACKGROUND OF THE INVENTION

Field of the Invention

The invention relates to a display apparatus and more particularly relates to a head-mounted display apparatus.

Description of Related Art

Generally, a head-mounted display apparatus includes an optical device, which is disposed near a user's face, or is integrated with other displays (e.g. image integrator) for displaying images. Such a configuration described above, however, may cause visual interference to the user or even cause harm to the user in cases of severe shock or collision. Therefore, another configuration has been proposed to use the mask of the head-mounted display apparatus as the screen for displaying images. This configuration may eliminate concerns about safety. However, the head-mounted display apparatus still requires a complex lens module or an off-axis optical system to correct optical aberration in order to maintain the image quality. In addition, since the complex lens module or the off-axis optical system also occupies some space of the head-mounted display apparatus, thus, the internal cushion design may have to be compromised. In view of the above, it remains an important issue to design a highly safe head-mounted display apparatus that renders favorable display quality.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention provides a head-mounted display apparatus that is highly safe and provides favorable display quality.

Other objects and advantages of the invention can be further illustrated by the technical features broadly embodied and described as follows.

In order to achieve one or a portion of or all of the objects or other objects, an embodiment of the invention provides a head-mounted display apparatus that includes a main body, a mask, and a projection apparatus. The mask is pivotally connected to the main body. The mask includes a reflection area. The reflection area has a first normal line. The projection apparatus is disposed in the main body and adapted to project an image beam to the reflection area of the mask. The reflection area reflects the image beam to a projection target. The projection apparatus includes a mirror. The mirror has a second normal line. An acute angle exists between normal projections of the first normal line and the second normal line on a reference plane.

According to the above descriptions, the embodiment of the invention has at least one of the following advantages or effects. In the exemplary embodiments of the invention, the normal projections of the first normal line of the reflection area of the mask and the second normal line of the mirror on the reference plane form an acute angle. Accordingly, the projection apparatus has superior display quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
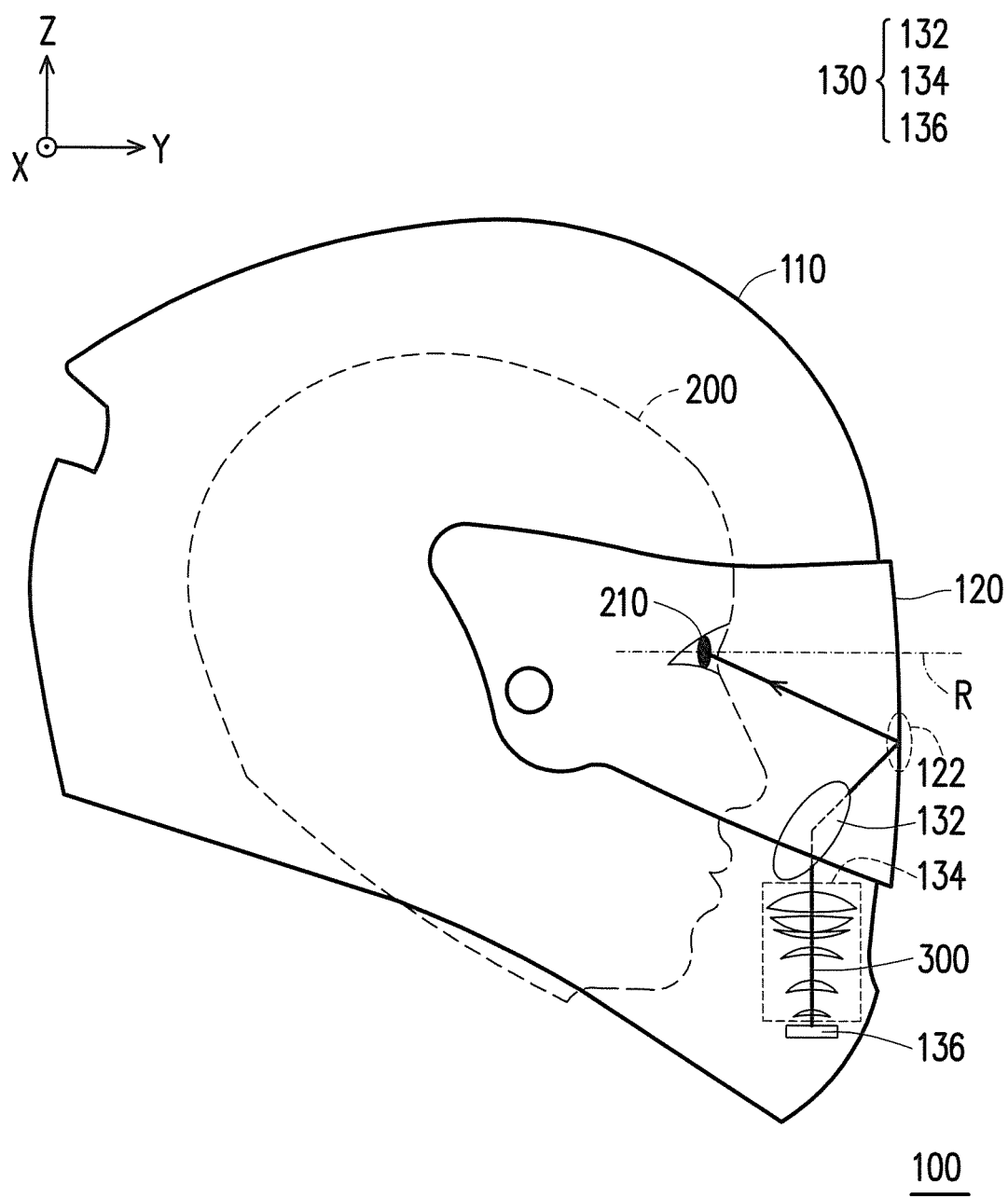
FIG. 1 is a schematic side view of the head-mounted display apparatus according to an embodiment of the invention.
Figure 2:
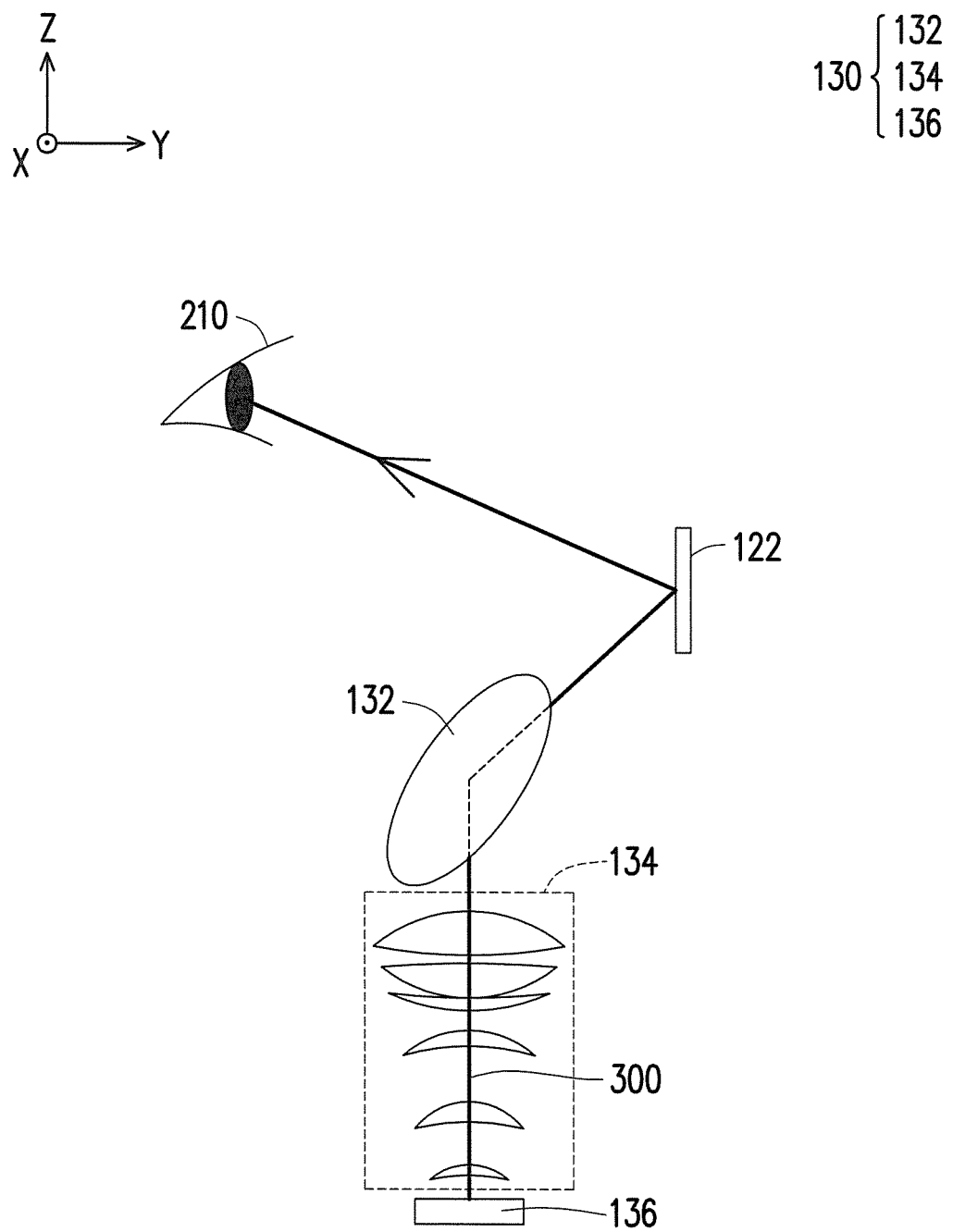
FIG. 2 is a schematic view of the projection apparatus according to the embodiment of FIG. 1.

FIG. 1 is a schematic side view of a head-mounted display apparatus according to an embodiment of the invention. FIG. 2 is a schematic view of a projection apparatus according to the embodiment of FIG. 1. Referring to FIG. 1 and FIG. 2, a head-mounted display apparatus 100 of this embodiment includes a main body 110, a mask 120, and a projection apparatus 130. The mask 120 is pivotally connected to the main body 110. The projection apparatus 130 is disposed in the main body 110 to reduce the number of additional devices disposed around a head of a user 200, so as to improve safety for the user 200. In this embodiment, the projection apparatus 130 is adapted to project an image beam 300 to the mask 120, and then the mask 120 reflects the image beam 300 to a projection target 210. The projection target 210 refers to eyes of the user 200, for example. Thereby, the user 200 is able to see image information that the projection apparatus 130 projects on the mask 120. Moreover, in this embodiment, the head-mounted display apparatus 100 is a helmet, for example. The main body 110 is a helmet body of the helmet while the mask 120 is a translucent mask of the helmet. Nevertheless, it should be noted that the invention is not intended to limit the appearance or form of the head-mounted display apparatus 100.

Specifically, in this embodiment, the projection apparatus 130 includes a mirror 132, a lens module 134, and a display panel 136. The mask 120 includes a reflection area 122. The reflection area 122 is selected from a planar area or a curved surface area on a surface of the mask 120, for example. However, the invention is not limited thereto. The display panel 136 is adapted to provide the image beam 300. The lens module 134 is configured to project the image beam 300 to the mirror 132. The mirror 132 projects the image beam 300 to the reflection area 122 of the mask 120. Then, the reflection area 122 reflects the image beam 300 to the projection target 210.

In this embodiment, the mirror 132 a free-form curved mirror, for example. The projection apparatus 130 corrects aberration caused by the reflection area 122 through the free-form curved mirror. Therefore, the head-mounted display apparatus 100 of this embodiment has superior display quality. In an embodiment, the lens module 134 includes at least one single-sided or double-sided freeform curved lenses. The projection apparatus 130 may also use the at least one single-sided or double-sided free-form curved lenses to correct the aberration caused by the reflection area 122 of the mask 120. However, the invention is not limited thereto. In another embodiment, the projection apparatus 130 may simultaneously use the free-form curved mirror and the at least one single-sided or double-sided free-form curved lenses to correct the aberration caused by the reflection area 122 of the mask 120.

Figure 3:
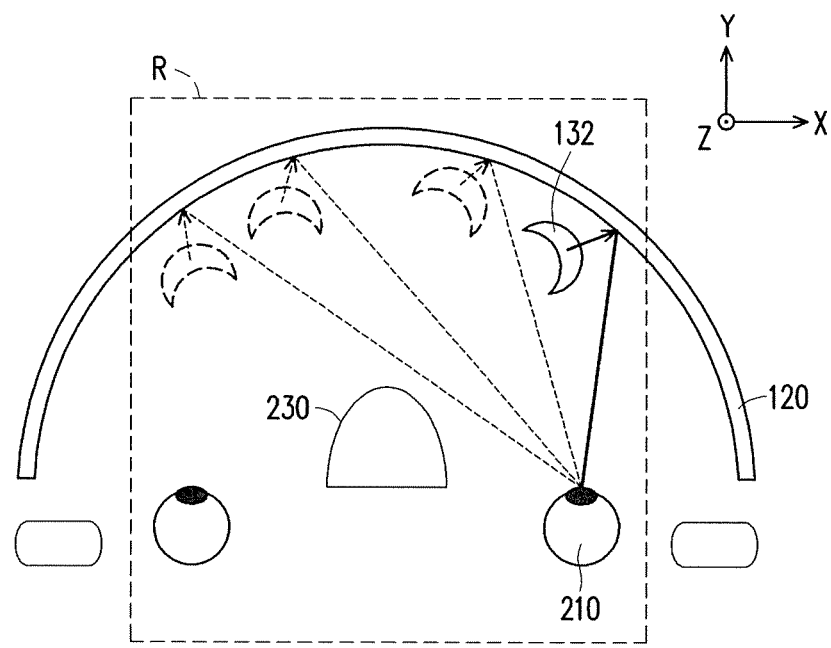
FIG. 3 is a schematic top view of the head-mounted display apparatus according to the embodiment of FIG. 1.
Figure 4:
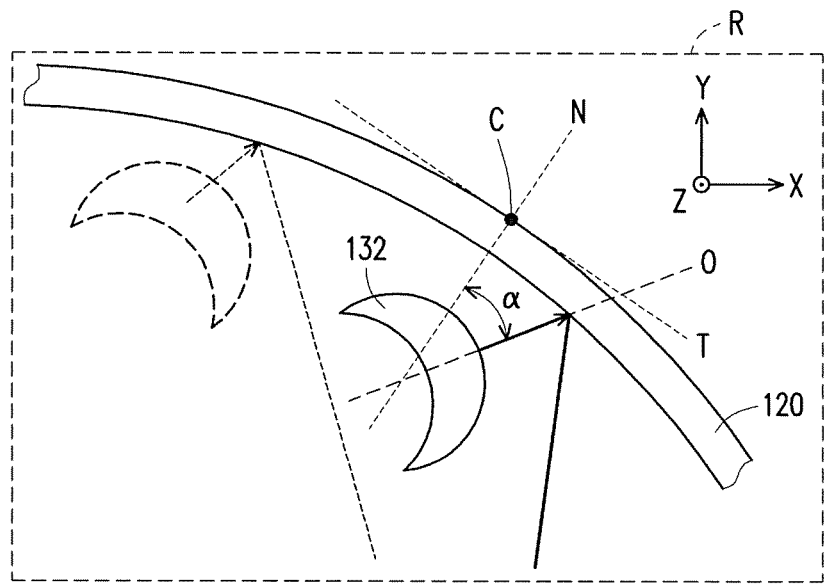
FIG. 4 is a schematic view showing a partial area of the head-mounted display apparatus according to the embodiment of FIG. 3.

FIG. 3 is a schematic top view of the head-mounted display apparatus according to the embodiment of FIG. 1. FIG. 4 is a schematic view showing a partial area of the head-mounted display apparatus according to the embodiment of FIG. 3. Referring to FIG. 1, FIG. 3, and FIG. 4, in this embodiment, a reference plane R is formed by three points, e.g. the eyes 210 of the user 200 and a nose bridge 230 between the eyes 210. In this embodiment, the reflection area 122 on the mask 120 is located on a tangential plane T with C as a tangent point and has a first normal line N, for example. The mirror 132 has a second normal line O, which is an optical axis of the mirror 132, for example. An acute angle α is formed by normal projections of the first normal line N and the second normal line O on the reference plane R, such that the image beam 300 is accurately projected to the eyes 210 of the user 200 when the mirror 132 is not right in front of the user 200.

Further, referring to FIG. 1, FIG. 3, and FIG. 4, in this embodiment, the mirror 132 is disposed below the reference plane R. The reflection area 122 of the mask 120 is also below the reference plane R. However, the invention is not limited thereto. In another embodiment, the mirror 132 may be disposed above the reference plane R. The reflection area 122 of the mask 120 may also be above the reference plane R. The invention is not intended to limit the positions of the mirror 132 and the reflection area 122.

In this embodiment, the mirror 132, the lens module 134, and the display panel 136 may be implemented respectively by using any type of mirror, lens module, and display panel of the related art (e.g. digital micro-mirror device (DMD) or LCOS (Liquid Crystal On Silicon) panel). The invention is not intended to limit the types of these components. Therefore, the structures of the mirror 132, the lens module 134, and the display panel 136 and implementations thereof can be understood sufficiently from the teaching, suggestion, and illustration of the common knowledge of the related art. Thus, the invention is not repeated hereinafter.

Figure 5:
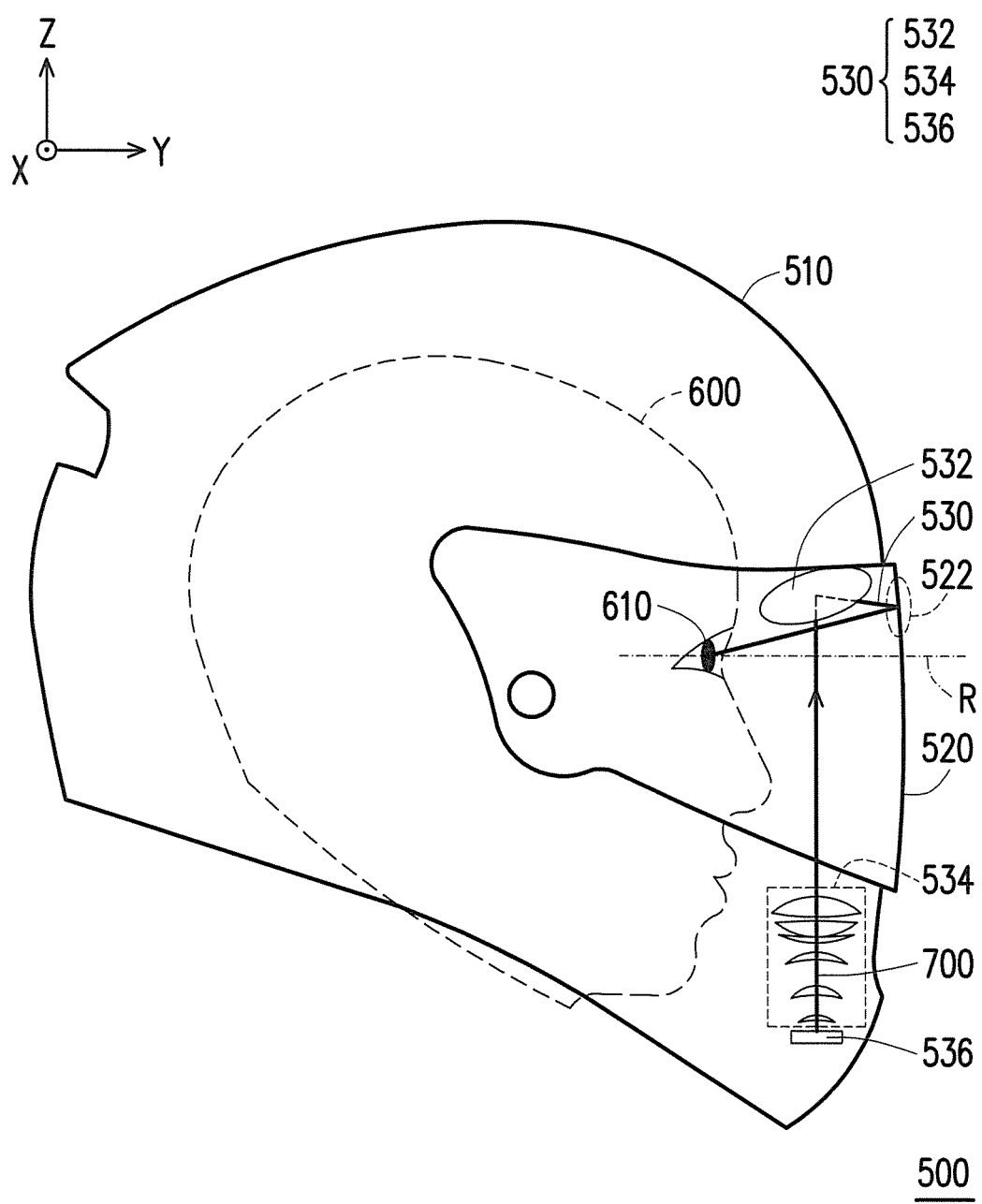
FIG. 5 is a schematic side view of the head-mounted display apparatus according to an embodiment of the invention.
Figure 6:
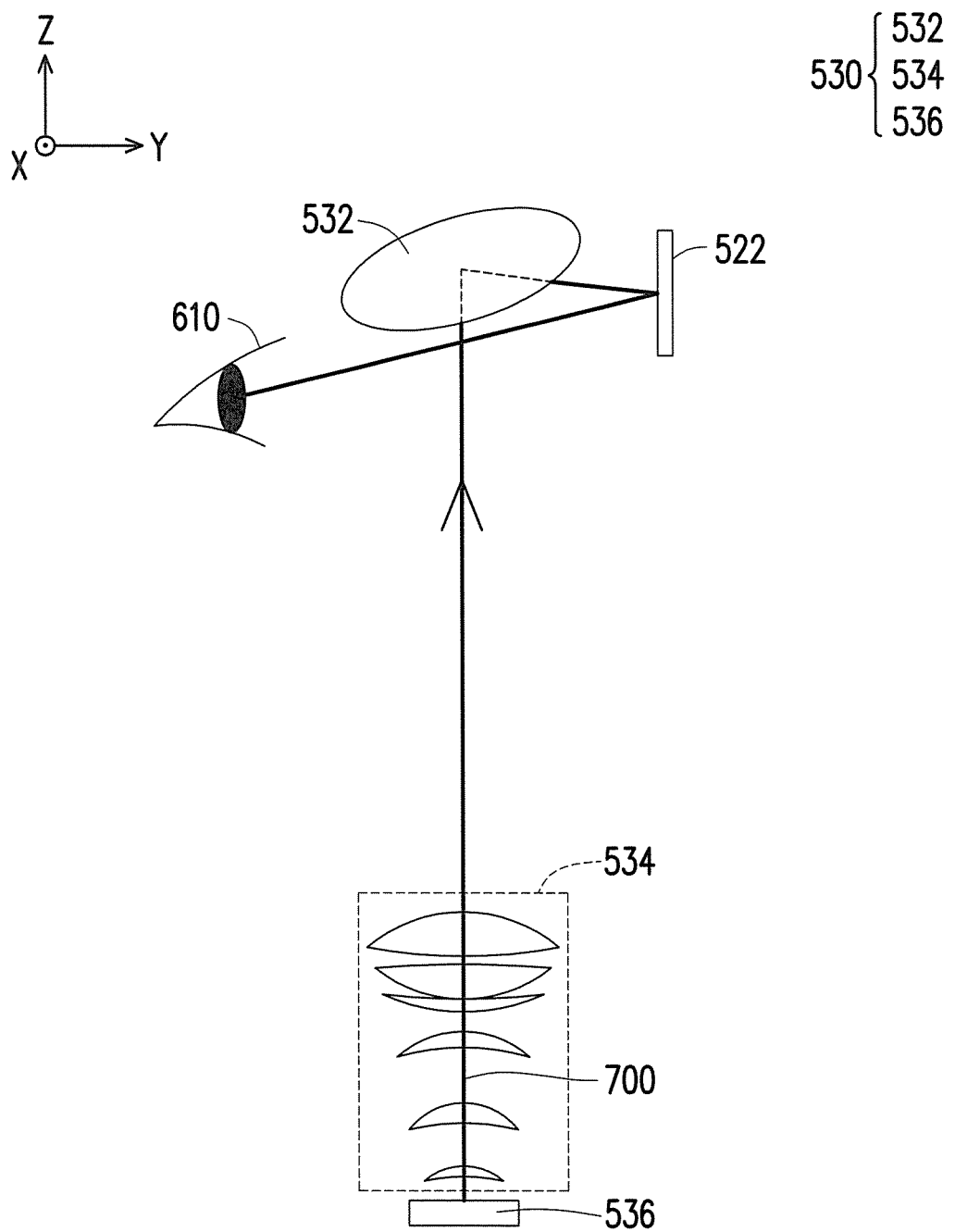
FIG. 6 is a schematic view of the projection apparatus according to the embodiment of FIG. 5.

FIG. 5 is a schematic side view of a head-mounted display apparatus according to an embodiment of the invention. FIG. 6 is a schematic view of the projection apparatus according to the embodiment of FIG. 5. Referring to FIG. 5 and FIG. 6, a head-mounted display apparatus 500 of this embodiment is similar to the head-mounted display apparatus 100 of the embodiment of FIG. 1. A main difference is that, in the head-mounted display apparatus 500, a mirror 532 is disposed above the reference plane R and a reflection area 522 of a mask 520 is also above the reference plane R, such that an image beam 700 provided by a display panel 536 is projected to the mirror 532 and then reflected to the reflection area 522 of the mask 520 to be projected to a projection target 610 (i.e. eyes of a user 600). Furthermore, the configuration of the head-mounted display apparatus and the operation method thereof according to this embodiment can be understood sufficiently from the teaching, suggestion, and illustration of the embodiments of FIG. 1 to FIG. 4. Thus, details thereof are not repeated hereinafter.

To sum up, the embodiments of the invention achieve at least one of the following advantages or effects. According to the exemplary embodiments of the invention, the projection apparatus is disposed in the main body to reduce the number of additional devices disposed near the user, so as to improve safety for the user. In addition, the projection apparatus uses the free-form curved mirror or free-form curved lens to correct the aberration caused by the reflection area of the mask and thereby renders favorable display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A head-mounted display apparatus, comprising:
   a main body;
   a mask pivotally connected to the main body and comprising a reflection area that has a first normal line; and
   a projection apparatus disposed in the main body and adapted to project an image beam to the reflection area of the mask such that the reflection area reflects the image beam to a projection target,
   wherein the head-mounted display apparatus is a helmet, and the main body is a helmet body of the helmet, and wherein the projection apparatus comprises a mirror reflecting the image beam that has a second normal line, and an acute angle is formed between a normal projection of the first normal line and a normal projection of the second normal line on a reference plane defined by eyes and a nose bridge between the eyes of a user, wherein the reflection area does not intersect the reference plane and is located either above or below the reference plane; and the mirror is a free-form curved mirror, by which the projection apparatus corrects an aberration caused by the reflection area of the mask.

2. The head-mounted display apparatus according to claim 1, wherein the projection apparatus further comprises a lens module projecting the image beam to the mirror, wherein the lens module comprises at least one single-sided or double-sided free-form curved lenses.

3. The head-mounted display apparatus according to claim 2, wherein the at least one single-sided or double-sided free-form curved lenses of the projection apparatus corrects the aberration caused by the reflection area of the mask.

4. The head-mounted display apparatus according to claim 2, wherein the projection apparatus corrects the aberration caused by the reflection area of the mask by the free-form curved mirror and the at least one single-sided or double-sided free-form curved lenses.

5. The head-mounted display apparatus according to claim 1, wherein the mirror is disposed above the reference plane and the reflection area of the mask is located above the reference plane.

6. The head-mounted display apparatus according to claim 1, wherein the mirror is disposed below the reference plane and the reflection area of the mask is located below the reference plane.

7. The head-mounted display apparatus according to claim 1, wherein the reflection area is selected from a planar area or a curved surface area on a surface of the mask.

8. The head-mounted display apparatus according to claim 1, wherein the mask is a translucent mask of the helmet.

* * * * *